(12) United States Patent
Fujita

(10) Patent No.: US 7,997,376 B2
(45) Date of Patent: Aug. 16, 2011

(54) EXHAUST SYSTEM FOR A VEHICLE

(75) Inventor: Akihiro Fujita, Shizuoka-ken (JP)

(73) Assignee: Suzuki Motor Corporation, Hamamatsu-shi, Shizuoka-ken (JP)

( * ) Notice: Subject to any disclaimer, the term of this patent is extended or adjusted under 35 U.S.C. 154(b) by 515 days.

(21) Appl. No.: 12/099,701

(22) Filed: Apr. 8, 2008

(65) Prior Publication Data

US 2009/0014229 A1   Jan. 15, 2009

(30) Foreign Application Priority Data

Apr. 9, 2007 (JP) ................................ 2007-101575

(51) Int. Cl.
*B60K 13/04* (2006.01)

(52) U.S. Cl. ......... 180/309; 180/89.2; 180/296; 60/313; 60/323

(58) Field of Classification Search .................. 180/309, 180/296, 89.2; 60/299, 305, 313, 322, 323
See application file for complete search history.

(56) References Cited

U.S. PATENT DOCUMENTS

| 5,195,607 A * | 3/1993 | Shimada et al. ............. 180/296 |
| 5,445,241 A * | 8/1995 | Nakamura et al. ........... 180/296 |
| 5,555,932 A * | 9/1996 | Dudley ......................... 165/135 |
| 7,246,680 B2 * | 7/2007 | Osterkamp et al. ........... 181/250 |
| 7,331,611 B2 * | 2/2008 | Kusu et al. .................... 280/834 |
| 7,628,238 B2 * | 12/2009 | Kobayashi et al. .......... 180/89.2 |
| 2001/0047897 A1 * | 12/2001 | Steenackers et al. ......... 180/89.2 |
| 2004/0194456 A1 * | 10/2004 | Kim ................................. 60/323 |
| 2005/0167968 A1 * | 8/2005 | Mabuchi et al. .............. 280/781 |
| 2006/0032694 A1 * | 2/2006 | Fujita et al. .................... 180/309 |
| 2006/0144632 A1 * | 7/2006 | Ranalli et al. ................. 180/309 |
| 2007/0240926 A1 * | 10/2007 | Chae et al. ..................... 180/309 |

FOREIGN PATENT DOCUMENTS

JP   06-108841 A   4/1994
JP   07-164898 A   6/1995

* cited by examiner

*Primary Examiner* — Hau V Phan
*Assistant Examiner* — John R Olszewski
(74) *Attorney, Agent, or Firm* — Lesley S. Craig

(57) ABSTRACT

An exhaust system (26) for a vehicle with a V-engine, aimed at increasing the output power of the V-engine, preventing heat conduction from the exhaust system to the parts around the exhaust system and enhancing the durability of the exhaust system is provided. A transmission and a transfer device (14) are connected in series to the V-engine with an output shaft extending in the longitudinal direction of the vehicle, the transmission and the transfer device (14) being provided in a tunnel (15) in a central portion of the floor (4) of the vehicle and protruding to an upper section of the vehicle, a pair of exhaust pipes (31, 32) being connected to each bank of the V-engine, the exhaust pipes (31, 32) converging into a convergence section provided under the floor (4) and extending to the rear of the vehicle.

2 Claims, 2 Drawing Sheets

EXHAUST SYSTEM FOR A VEHICLE

FIELD OF THE INVENTION

The present invention relates to an exhaust system for a vehicle, and, in particular, to an exhaust system for increasing the output power of a V-engine and for enhancing the durability of the exhaust system by improving the exhaust pipe arrangement of the V-engine.

BACKGROUND OF THE INVENTION

Vehicles in which a V-engine is installed with the output shaft extending in the longitudinal direction of the vehicle, a transmission and a transfer device being connected in series to the V-engine, and the transmission and the transfer device being provided in a tunnel provided at a central portion of a floor of the vehicle and protruding to an upper section of the vehicle are generally known. The exhaust system for such vehicle has a structure in which a pair of exhaust pipes are connected to banks of the V-engine, and the exhaust pipes converge into a convergence section provided under the vehicle floor and extend to the rear section of the vehicle.

Japanese Laid-open Patent Publication No. H06-108841 discloses an exhaust system for a vehicle based on the conventional technology, in which an exhaust pipe extending from a bank provided at one side of a V-engine extends from the one side to the other side in the lateral direction of the vehicle through a concave portion provided at a bottom portion of an oil pan arrangement, and this exhaust pipe extending from the bank provided at one side of the V-engine and another exhaust pipe extending from another bank provided at the other side of the V-engine are converged into a convergence section adjacent to a transmission for the V-engine and provided at a side portion of the other side in the lateral direction of the vehicle, and extend to the rear of the vehicle.

Further, from Japanese Laid-open Patent Publication No. H07-164898 there is known an exhaust system for a vehicle based on the conventional technology in which an exhaust pipe extending from a bank provided at one side of the V-engine extends from the one side to the other side of the vehicle in the lateral direction for the vehicle under a transfer device, and this exhaust pipe extending from the bank provided at one side and the exhaust pipe extending from another bank provided at the other side of the vehicle are converged into a muffler provided on a side portion of the other side in the lateral direction of the vehicle with respect to a propeller shaft extending from the transfer device rearward, to then extend to the rear of the vehicle.

PROBLEMS TO BE SOLVED BY THE INVENTION

In a conventional exhaust system of a vehicle having each exhaust pipe converged rearwardly of the transfer device as described in Japanese Laid-open Patent Publication No. H07-164898, the structure of the exhaust pipes becomes too complicated and, although output power of the V-engine can be increased by preventing exhaust interference between cylinders, heat from the exhaust pipes is disadvantageously conducted to the vehicle floor.

In the exhaust system of a vehicle having exhaust pipes converged at the proximity of the V-engine as described in Japanese Laid-open Patent Publication No. H06-108841, the structure of the exhaust pipes can be simplified sufficiently to solve the above problem of the complicated structure of the exhaust pipes. However, a new problem arises resulting in a drop of output power of the V-engine due to the lengths of each exhaust pipe to the convergence section being unequal. Another problem with this type of exhaust pipe for a vehicle is that, because the convergence portion is not cooled by air flow resulting from travel, the floor around the convergence section gets heated and thermal distortion occurs at the convergence section, with a negative effect on durability of the exhaust system.

SUMMARY OF THE INVENTION

The aim of the present invention is to increase the output power of a V-engine, to provide a structure which ensures that heat generated in an exhaust system is barely conducted to the parts around the exhaust system, and to enhance the durability of the exhaust system for a vehicle.

The present invention provides an exhaust system for a vehicle having a structure in which a transmission and a transfer device are connected in series to a V-engine with the output shaft extending in the longitudinal direction of the vehicle, the transmission and the transfer device are provided in a tunnel provided at a central portion of a floor of the vehicle and protruding to an upper section of the vehicle; a pair of exhaust pipes are connected to each bank of the V-engine; the exhaust pipes are converged into a convergence section provided under the floor and extend to the rear section of the vehicle. In the exhaust system, the convergence section is provided at a side portion of the transfer device in the lateral direction of the vehicle with a portion thereof located under the tunnel.

According to another embodiment of the exhaust system for a vehicle according to the present invention, a first path extending along the transfer device in the longitudinal direction of the vehicle and a second path converging into this first path diagonally from the front are provided in the convergence section of the exhaust pipes, a first exhaust pipe connected to a bank located at the opposite side from the convergence section in the lateral direction of the vehicle extends under the transmission and is connected to the first path; and a second exhaust pipe connected to a bank located at the same side as the convergence section in the lateral direction of the vehicle is bent outwards and connected to the second path.

According to a further embodiment of the exhaust system for a vehicle according to the present invention the V-engine is supported via a sub-frame by and between a pair of frame members; the transfer device is supported by a cross member between the frame members; and the convergence section is provided above the cross member.

According to a further embodiment of the exhaust system for a vehicle according to the present invention, a catalytic converter is provided downstream from the convergence section; and the catalytic converter is provided under the tunnel to the side of the transfer device in the lateral direction of the vehicle.

The exhaust system according to the present invention has a convergence section which is provided to a side of the transfer device in the lateral direction of the vehicle, which is away from the V-engine, such that the exhaust system can prevent exhaust gas interference by increasing the distance from banks to the convergence section allowing the exhaust system to increase output power from the V-engine.

Further, the exhaust system according to the present invention has the convergence section provided at the side of the transfer device, the latter having a smaller cross section than that of the transmission, and the major portion of the convergence section is provided under a tunnel provided on the vehicle floor, so that the exhaust system can prevent heat conduction to the floor by extending a space between the convergence section and the floor.

An embodiment of the present invention will be described below with reference to the related drawings.

DETAILED DESCRIPTION OF A PREFERRED EMBODIMENT

Figure 1:
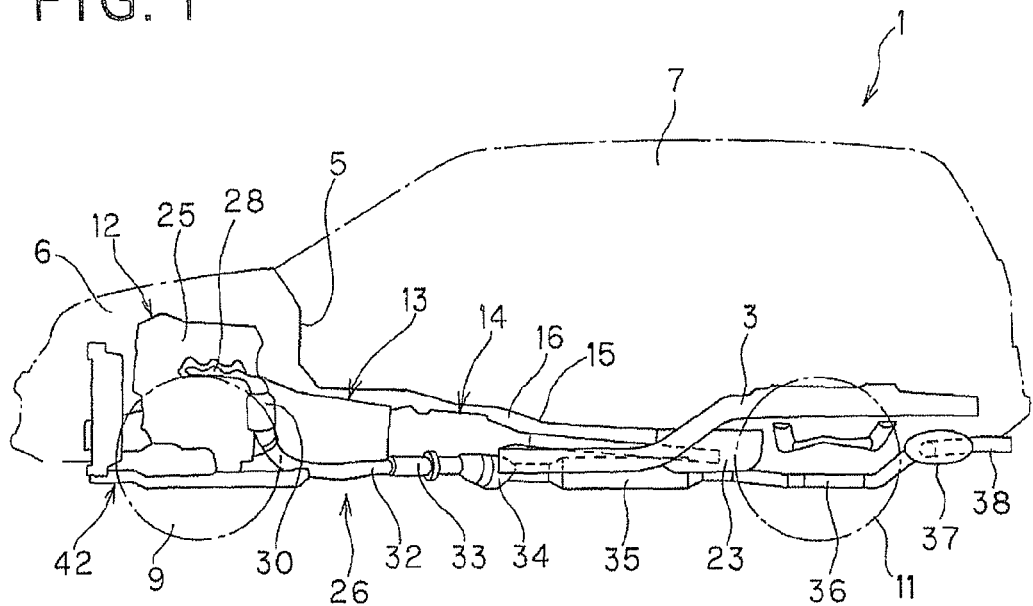
FIG. 1 is a side view of the exhaust system of the vehicle according to an embodiment of the present invention.
Figure 2:
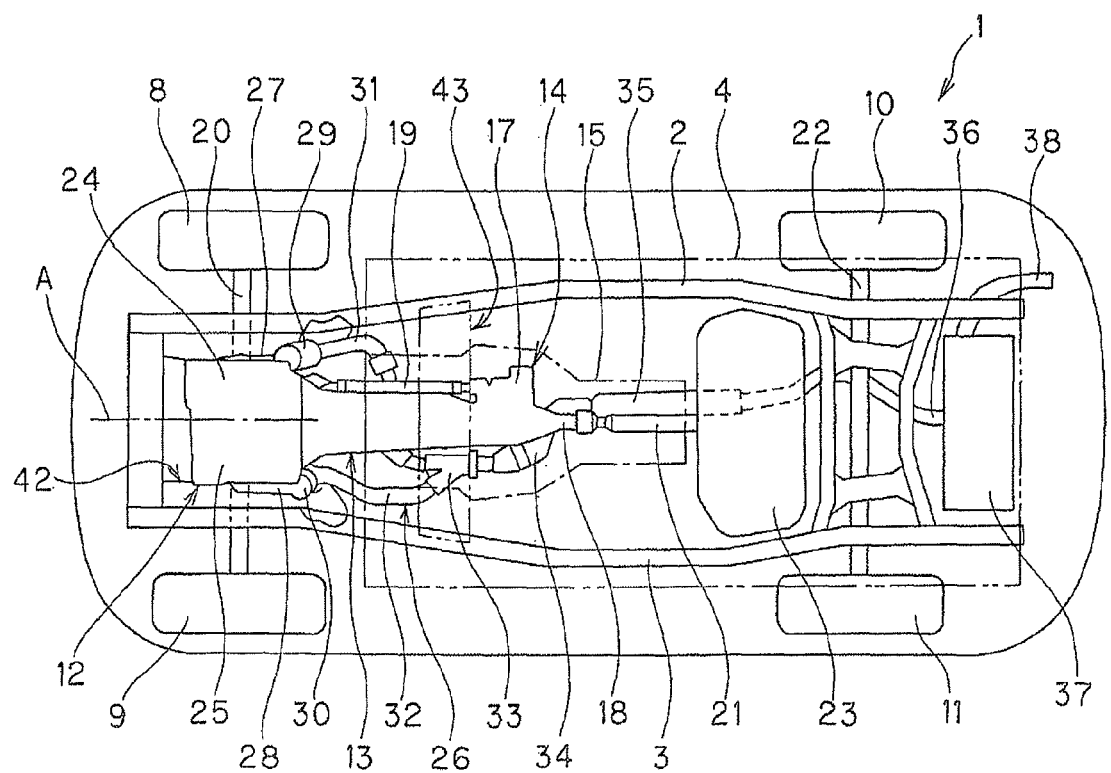
FIG. 2 is a plan view of the exhaust system of the vehicle according the present invention.

In FIGS. 1 and 2, reference numeral 1 denotes a vehicle, 2 a first frame member at a right side extending in the longitudinal direction of the vehicle, 3 a second frame member at a left side extending in the longitudinal direction of the vehicle, 4 a floor, 5 a dash panel, 6 an engine compartment, 7 a passenger compartment, 8 a right front wheel, 9 a left front wheel, 10 a right rear wheel, and 11 a left rear wheel.

In the vehicle 1, a V-engine 12 with an output shaft A extending in the longitudinal direction of the vehicle is mounted in engine compartment 6, and a transmission 13 and a transfer device 14 are connected in series to the V-engine 12. The transmission 13 and the transfer device 14 are provided in a tunnel space 16 of a tunnel 15 provided at a central portion of a floor 4 of the vehicle 1 and protruding towards an upper section of the vehicle. The transfer device 14 has a front wheel power output section 17 and a rear wheel power output section 18, providing driving force to a right front wheel 8 and a left front wheel 9 through a front differential gear and a front axle 20 via a front propeller shaft 19 extending frontward from front wheel power output section 17, and providing driving force to a right rear wheel 10 and a left rear wheel 11 through a rear differential gear and a rear axle 22 via a rear propeller shaft 21 extending backward from the rear wheel power output section 18. The vehicle 1 has a fuel tank 23 provided in front of rear axle 22 and under the floor 4.

The V-engine 12 has a first bank 24 and a second bank 25 respectively at the right and left sides in the lateral direction of the vehicle, and the banks 24 and 25 are connected to a pair of first and second exhaust manifolds 27 and 28 to configure exhaust system 26. The exhaust manifold 27 and 28 are connected respectively to end portions of first and second exhaust pipes 31 and 32 through first and second catalytic converters 29 and 30. The other ends of the first and second exhaust pipes 31 and 32 are converged into each other in a convergence section 33 provided under the floor 4 and extending backward in the longitudinal direction of the vehicle. The convergence section 33 is connected to a third catalytic converter 34, a sub-muffler 35 and a rear exhaust pipe 36 provided in series along and extending in the longitudinal direction of the vehicle. The rear exhaust pipe 36 extends backward in the longitudinal direction of the vehicle under the fuel tank 23 and the axle 22, and is connected to a main muffler 37 provided at the back of the rear axle 22 and under the floor 4. The main muffler 37 is connected to a tail pipe 38.

Figure 3:
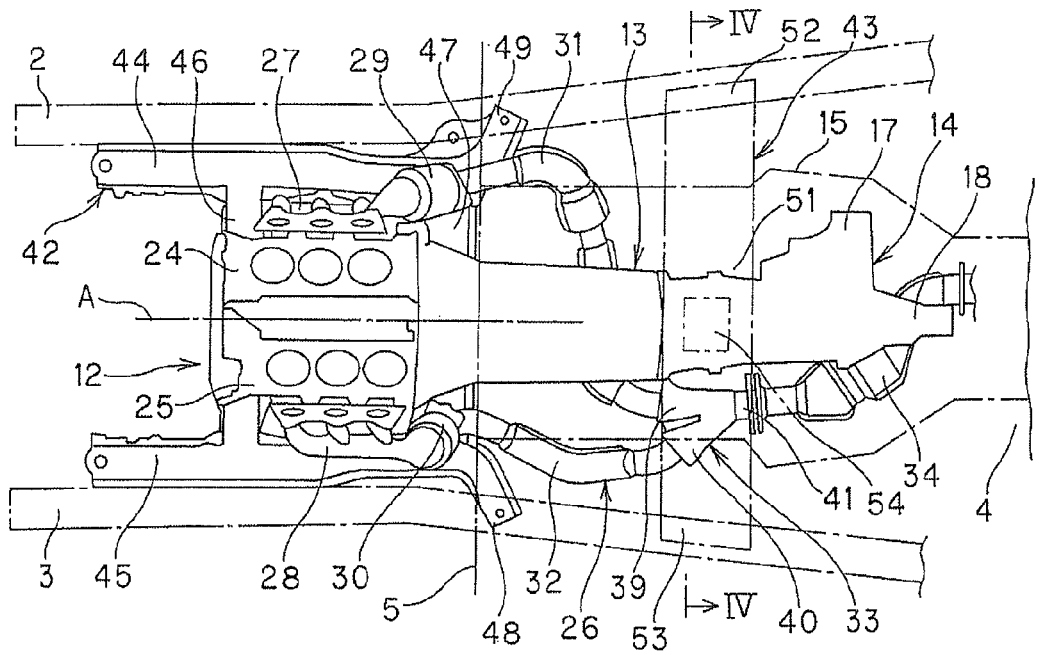
FIG. 3 is an enlarged plan view of an exhaust system of the vehicle according to the present invention.
Figure 4:
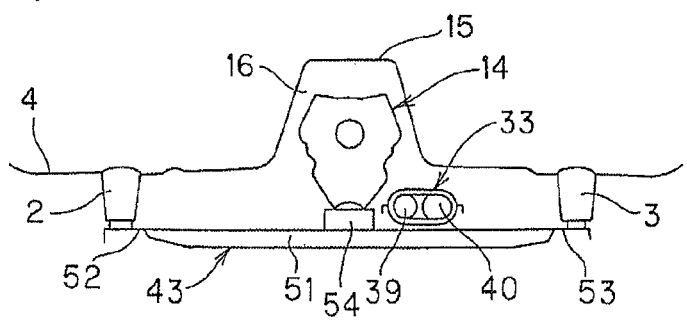
FIG. 4 is a cross sectional view taken along the IV-IV line in FIG. 3.

As shown in FIGS. 3 and 4, the exhaust system 26 for the vehicle 1 has a structure in which the convergence section 33 is provided at a left side of the transfer device 14 in the lateral direction of the vehicle with a portion thereof positioned under the tunnel 15.

In this configuration, the exhaust system 26 for the vehicle 1 has a structure in which the convergence section 33 is provided at a side of transfer device 14 in the lateral direction of the vehicle, which is away from the V-engine 12, and therefore exhaust interference can be prevented by increasing a distance from each bank 27 and 28 to the convergence section 33, accompanied by an increase of output power of V-engine 12. In addition, the exhaust system 26 for the vehicle 1 has a structure in which the convergence section 33 is provided at the side of the transfer device 14 having a smaller cross section compared to that of the transmission 13, allowing the major portion of convergence section 33 to be provided under tunnel 15 provided in the floor 4, so that heat conduction to the floor 4 can be prevented by increasing the space between the convergence section 33 and the floor 4.

As shown in FIG. 3, the exhaust system 26 for the vehicle 1 has a structure in which a first path 39 extending along the transfer device 14 in the longitudinal direction of the vehicle and a second path 40 converging into first path 39 diagonally from the front left side form convergence section 33 located at the left side of transfer device 14 in the lateral direction of the vehicle, and the first path 39 and the second path 40 converge into each other in convergence section 33 to form a combined section extending backward in the longitudinal direction of the vehicle. The combined section 41 is connected to the third catalytic converter 34.

Of the first and the second exhaust pipes 31 and 32 of the exhaust system 26, the first pipe 31 connected to the first bank 24 located at the right side which is the opposite side from the convergence section 33 with respect to the output shaft A in the lateral direction of the vehicle is connected to the left side of the first path 39 with a shortest distance under the transmission 13, and the second pipe 32 connected to the second bank 25 located at the left side which is the same side as the convergence section with respect to the output shaft A in the lateral direction of the vehicle is bent outward in the lateral direction of the vehicle and extended to connect to the second path 40.

As described above, the exhaust system 26 for the vehicle 1 has a structure in which the first exhaust pipe 31 connected to the convergence section 33 is provided under the transmission 13 and the second exhaust pipe 32 connected to the convergence section 33 is bent outward in the lateral direction of the vehicle, and therefore the length of the first exhaust pipe 31 and the length of the second exhaust pipe 32 are equal, which advantageously leads to an increase of output power of the V-engine. In addition, the exhaust system 26 for the vehicle 1 has a structure in which the second exhaust pipe 32 is bent outward in the lateral direction of the vehicle, and therefore it is possible to prevent the second exhaust pipe 32 from following the first exhaust pipe 31 and deforming during thermal expansion, which enables improvement of the durability of the exhaust system 26.

Figure 5:
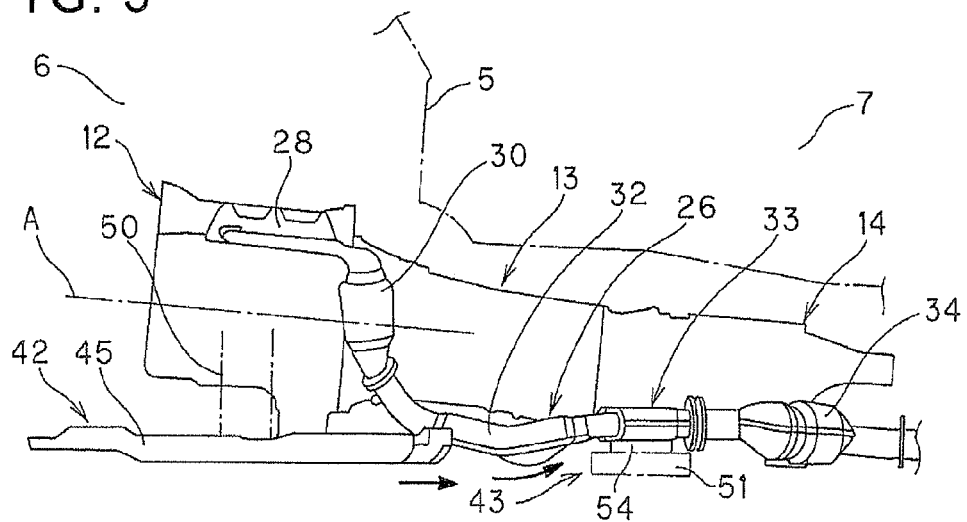
FIG. 5 is an enlarged side view of an exhaust system according to the invention.

As shown in FIGS. 3 and 5, in the vehicle 1, the V-engine 12 is supported between a pair of left and right frame members comprising first frame member 2 and second frame member 3 via a sub-frame 42, and the transfer device 14 is supported between first frame member 2 and second frame member 3 via a cross member 43.

The sub-frame 42 is formed with a ladder shape with a first sub-frame section 44 extending substantially parallel to the first frame member 2, a second sub-frame section 45 extending substantially parallel to the second frame member 3, a first connecting frame 46 extending in the lateral direction of the vehicle and connecting front portions of the first and the second sub-frame sections 44 and 45 to each other, and a second connecting frame 47 extending in the lateral direction of the vehicle and connecting rear portions of the first and the second sub-frame sections 44 and 45 to each other.

In the sub-frame 42, outwardly-bent attachment sections 48 and 49 to the first and the second frame members located at rear end portions of the first and the second sub-frame sections 44 and 45 are provided. The attachment sections 48 and 49 to the first and the second frame members are attached to the first and the second frame members 2 and 3 so that the sub-frame 42 is provided under the V-engine 12. The V-engine 12 is supported on the sub-frame 42 with a first mount provided on the right side of the vehicle and a second mount 50 provided on the left side of the vehicle, and is supported between the first and the second frame members 2 and 3 with the sub-frame 42.

In the cross member 43, a box-shaped prolongation section 51 extending in the lateral direction of the vehicle is provided, and the prolongation section 51 has first and second frame member mounting sections 52 and 53 at both ends thereof in the longitudinal direction of the prolongation section 51 directed in the lateral direction of the vehicle. The first and the second frame member mounting sections 52 and 53 are attached to the first and the second frame members 2 and 3 so that the cross member 43 can be provided under the transfer device 14. The transfer device 14 is supported on the cross member 43 with a rear mount 54, and is supported between the first and the second frame members 2 and 3 via the cross member 43. As shown in FIG. 4, in the exhaust system 26 for the vehicle 1, the convergence section 33 is provided over the cross member 43.

As described above, the exhaust system 26 for the vehicle 1 has a structure in which the convergence section 33 is provided over the cross section 43 exhibiting limited movement of transfer device 14, allowing the convergence section to be positioned near the transfer device 14, and the major portion of the convergence section 33 being able to be provided under the tunnel 15. Therefore, the exhaust system 26 can decrease heat conduction from the convergence section 33 to the floor 4. Further, the exhaust system 26 for the vehicle 1 has a structure that allows the convergence section 33 to be cooled by passage of air during travel under sub-frame 42 by locating convergence section 33 away from sub-frame 42, so that heat conduction to the parts around the exhaust system can be decreased.

As illustrated in FIGS. 3 and 5, the exhaust system 26 for the vehicle 1 has a structure in which the third catalytic converter 34 is provided downstream from the convergence section 33, and this third catalytic converter 34 is provided under the tunnel 15 to the left of the transfer device 14 in the lateral direction of the vehicle.

In this way, the exhaust system 26 can enhance the ability of the third catalytic converter 34 to purify exhaust gas by introducing the exhaust gas with a high temperature immediately after passing through the convergence section 33 into the third catalytic converter 34. The exhaust system 26 also prevents heat conduction to the floor 4 by extending a space between the third catalytic converter 34 and the floor 4.

The exhaust system for the vehicle according to the present invention can increase output power of the V-engine, prevent heat conduction from the exhaust system to the parts around the exhaust system, and enhance the durability of the exhaust system. The exhaust system for the vehicle according to the present invention can be applied to various kinds of vehicles.

EXPLANATION OF REFERENCE NUMERALS

1. Vehicle
2. First frame
3. Second frame
4. Floor
12. V-engine
13. Transmission
14. Transfer device
15. Tunnel
24. First bank
25. Second bank
26. Exhaust system
31. First exhaust pipe
32. Second exhaust pipe
34. Third catalytic converter
39. First path
40. Second path
41. Combined section
42. Sub-frame
43. Cross member

What is claimed is:

1. An exhaust system for a vehicle having a structure in which a transmission and a transfer device are connected in series to a V-engine with the output shaft extending in a longitudinal direction of the vehicle, the transmission and the transfer device are provided in a tunnel provided at a central portion of a floor of the vehicle and protruding to an upper portion of the vehicle; a pair of exhaust pipes are connected to each bank of the V-engine; the exhaust pipes are converged into a convergence section provided under the floor and extend to the rear section of the vehicle, wherein the V-engine is supported via a sub-frame by and between a pair of frame members; the transfer device is supported by a cross member between the frame members, and wherein the convergence section is provided at a side portion of the transfer device in the lateral direction of the vehicle with a portion thereof located under the tunnel and above the cross member.

2. An exhaust system for a vehicle having a structure in which a transmission and a transfer device are connected in series to a V-engine with the output shaft extending in a longitudinal direction of the vehicle, the transmission and the transfer device are provided in a tunnel provided at a central portion of a floor of the vehicle and protruding to an upper portion of the vehicle; a pair of exhaust pipes are connected to each bank of the V-engine; the exhaust pipes are converged into a convergence section provided under the floor and extend to the rear section of the vehicle, wherein the convergence section is provided at a side portion of the transfer device in the lateral direction of the vehicle with a portion thereof located under the tunnel, and wherein a catalytic converter is provided downstream of the convergence section; and the catalytic converter is provided under the tunnel to a side of the transfer device in the lateral direction of the vehicle.

* * * * *